United States Patent
Wynn

(10) Patent No.: US 6,373,903 B1
(45) Date of Patent: Apr. 16, 2002

(54) APPARATUS AND METHOD FOR INCREASING THE EFFECTIVE DATA RATE IN COMMUNICATION SYSTEMS UTILIZING PHASE MODULATION

(75) Inventor: Stephen R. Wynn, Lynchburg, VA (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/144,359

(22) Filed: Aug. 31, 1998

(51) Int. Cl.⁷ .............................................. H04L 27/20
(52) U.S. Cl. ........................ 375/308; 375/283; 375/330
(58) Field of Search ................................ 375/223, 273, 375/279, 281, 283, 308, 329, 330; 329/304; 332/103; 455/23

(56) References Cited

U.S. PATENT DOCUMENTS

| | | | | |
|---|---|---|---|---|
| 5,222,103 A | * | 6/1993 | Gross | 375/281 |
| 5,528,631 A | * | 6/1996 | Hayashi et al. | 375/283 |
| 5,956,328 A | * | 9/1999 | Sato | 370/335 |
| 6,049,572 A | * | 4/2000 | Hansen | 375/298 |
| 6,127,884 A | * | 10/2000 | Rishi | 329/304 |

* cited by examiner

Primary Examiner—Stephen Chin
Assistant Examiner—Chieh M. Fan
(74) Attorney, Agent, or Firm—Wood, Phillips, Van Santen, Clark & Mortimer

(57) ABSTRACT

A system is disclosed for providing communication across a wireless network. The system includes a transmitter transmitting a modulated signal across a radio channel, wherein the transmitter includes first input means for receiving a primary data signal to be transmitted, second input means for receiving a secondary data signal to be transmitted, a combiner associated with the first and second input means for combining the primary and secondary data signals, and a modulator receiving the combined primary and secondary data signals from the combiner and sequentially developing a modulated signal including a string of phase values with each phase value containing information relative to both the primary and secondary data signals. The system also includes a receiver for receiving the modulated signal, wherein the receiver includes means for separating the received modulated signal into primary and secondary phase values representative of the primary and secondary data signals.

19 Claims, 3 Drawing Sheets

APPARATUS AND METHOD FOR INCREASING THE EFFECTIVE DATA RATE IN COMMUNICATION SYSTEMS UTILIZING PHASE MODULATION

FIELD OF THE INVENTION

The present invention is directed toward an apparatus and method for increasing the effective data rate of a transmitted signal and, more particularly, toward increasing the effective data rate of a phase modulated signal.

BACKGROUND OF THE INVENTION

The use of multi-level modulation techniques (phase and amplitude) are generally well known. Increasing the level of modulation at a transmitter effectively increases its data rate, i.e., increases the number of bits per symbol that may be transmitted. For instance, $\pi/4$-DQPSK (Differential Quadrature Phase Shift Keying) modulation is a well known 2-level modulation technique transmitting two bits per symbol. Another well known modulation technique, 16QAM (Quadrature Amplitude Modulation), is a 4-level modulation technique transmitting four bits per symbol. While the higher level modulations provide higher data rates for the same channel bandwidth, there is a loss in channel sensitivity which may cause distortion under high SNR (Signal-to-Noise Ratio) conditions. Thus, higher level modulations are more reasonable at relatively good channel conditions.

Modern telecom modems utilize 256QAM modulation to transmit eight bits per symbol. Thus, noise will have a strong effect on the performance of the transmission link, or data pipeline. Accordingly, in noisy channel conditions the modem will automatically revert to lower modulation techniques that have greater noise immunity.

In wireless communication systems, fully linear modulation, such as 16QAM and higher modulation levels, is difficult to design and control. This is particularly due to the large dynamic range of RF (Radio Frequency) links, or channels, present in fully linear modulation. A system using fully linear modulation techniques requires sensitive linear receivers having accurate, dynamic AGC (Automatic Gain Control) amplifiers, transmitters with linear PAs (Power Amplifiers), and other such components.

Utilizing PSK (Phase Shift Keying) type modulation enables IF (Intermediate Frequency) limited receivers to be utilized, while providing some level of modulation depth. However, one drawback is that since PSK is phase-only modulation, the second dimension of amplitude modulation available to QAM type modulations is unavailable in PSK modulation. The modulation bits per symbol in phase-only modulation (PSK) is limited by how finely one can space the points of the differential constellation around the unit circle.

The four possible phase transitions available in $\pi/4$-DQPSK modulation provide a high level of noise immunity. Thus, there is some maneuvering room when it comes to expanding $\pi/4$-DQPSK to higher bits per symbol in good channel conditions. If $\pi/4$-DQPSK is expanded to include more constellation points, the receiver at the receiving link would need to be notified that a new differential constellation spacing is being transmitted with a higher level of bits per symbol. This would require a full coordination of the transmitting and receiving units. However, when expanding $\pi/4$-DQPSK to a higher bits per symbol rate, the issue of AM (Amplitude Modulation) should be considered. As the spacing of the $\pi/4$-DQPSK differential constellation grows, so does the chance of phase transitions close to zero level amplitude, which cannot be handled by the transmitter. This limits $\pi/4$-DQPSK expansion.

The present invention is directed toward overcoming one or more of the above-mentioned problems.

SUMMARY OF THE INVENTION

A system is disclosed for providing communication across a wireless network. The system includes a transmitter transmitting a modulated signal across a radio channel, wherein the transmitter includes first input means for receiving a primary data signal to be transmitted, second input means for receiving a secondary data signal to be transmitted, a combiner associated with the first and second input means for combining the primary and secondary data signals, and a modulator receiving the combined primary and secondary data signals from the combiner and sequentially developing a modulated signal including a string of phase values with each phase value containing information relative to both the primary and secondary data signals. The system also includes a receiver for receiving the modulated signal, wherein the receiver includes means for separating the received modulated signal into primary and secondary phase values representative of the primary and secondary data signals.

The above-described system transparently increases the effective transmitted data rate using phase modulation techniques. The existing infrastructure and hardware available in a $\pi/4$-DQPSK communication system are utilized with little change in software. The system is particularly useful in relative good channel conditions and increases the perceived usefulness of communication systems utilizing $\pi/4$-DQPSK modulation techniques.

In one form, the first input means includes a first impulse stream encoder receiving the primary data signal and generating a first impulse stream representative thereof. The second input means includes a second impulse stream encoder receiving the secondary data signal and generating a second impulse stream representative thereof.

In another form, the second impulse stream encoder receives an information signal from the first impulse stream encoder indicative of the phase transition in the primary data signal. The second impulse stream generated by the second impulse stream encoder represents a modification of the phase transition in the primary data signal.

In another form, the combiner includes a summer summing the first and second impulse streams.

In another form, the modulated signal includes a DQPSK signal.

In another form, the modulator includes an IQ modulator.

In another form, the separating means includes first determining means for determining the primary phase values from the received modulated signal, and second determining means responsive to the first determining means for determining the secondary phase values from the received modulated signal.

In yet another form, the first determining means includes a phase differentiator determining differences between successive phase values in the received modulated signal, the differences including the primary phase values, and a first converter converting the primary phase values into an approximation of the primary data signal. The second determining means includes a second converter converting the approximated primary data signal into converted phase values, and a subtractor subtracting the primary phase values from the converted phase values to generate the secondary phase values.

In still another form, the second determining means further includes a third converter converting the secondary phase values into an approximation of the secondary data signal.

A method of communication across a wireless network is also provided. The method includes the steps of transmitting a modulated signal across a radio channel, the modulated signal including a string of phase values with each phase value containing information relative to primary and secondary data signals, receiving the modulated signal, and separating the received modulated signal into primary and secondary phase values representative of the primary and secondary data signals.

In one form, the step of transmitting a modulated signal across a radio channel includes the steps of receiving the primary data signal to be transmitted, receiving the secondary data signal to be transmitted, combining the primary and secondary data signals, modulating the combined primary and secondary data signals to sequentially develop the modulated signal, and transmitting the modulated signal across the radio channel.

In another form, the step of transmitting a modulated signal across a radio channel further includes the steps of generating a first impulse stream representative of the primary data signal, and generating a second impulse stream representative of the secondary data signal. The step of combining the primary and secondary data signals includes the step of combining the first and second impulse streams.

In another form, the step of combining the first and second impulse streams includes the step of summing the first and second impulse streams together.

In another form, the modulated signal includes a DQPSK signal.

In another form, the step of separating the received modulated signal into primary and secondary phase values representative of the primary and secondary data signals includes the steps of determining the primary phase values from the received modulated signal, and determining, responsive to the primary phase value determination, the secondary phase values from the received modulated signal.

In yet another form, the step of determining the primary phase values from the received modulated signal includes the steps of determining differences between successive phase values in the received modulated signal, the differences including the primary phase values, and converting the primary phase values into an approximation of the primary data signal. The step of determining, responsive to the primary phase value determination, the secondary phase values from the received demodulated signal includes the steps of converting the approximated primary data signal into converted phase values, and subtracting the primary phase values from the converted phase values to generate the secondary phase values.

In still another form, the step of determining, responsive to the primary phase value determination, the secondary phase values from the received modulated signal further includes the step of converting the secondary phase values into an approximation of the secondary data signal.

It is an object of the present invention to increase the effective transmitted data rate in a communication system using phase modulation techniques.

It is a further object of the present invention to increase the effective transmitted data rate in a π/4-DQPSK communication system.

It is a further object of the present invention to transparently increase the effective transmitted data rate in a π/4-DQPSK communication system.

It is a further object of the present invention to increase the effective transmitted data rate in a π/4-DQPSK communication system utilizing the existing infrastructure and hardware, with little change in software.

It is still a further object of the present invention to increase the perceived usefulness of π/4-DQPSK communication systems.

It is yet a further object of the present invention to increase the effective transmitted data rate in π/4-DQPSK communication systems in relatively good channel conditions.

Other aspects, objects and advantages of the present invention can be obtained from a study of the application, the drawings, and the appended claims.

DETAILED DESCRIPTION OF THE PREFERRED EMBODIMENT

Figure 1:
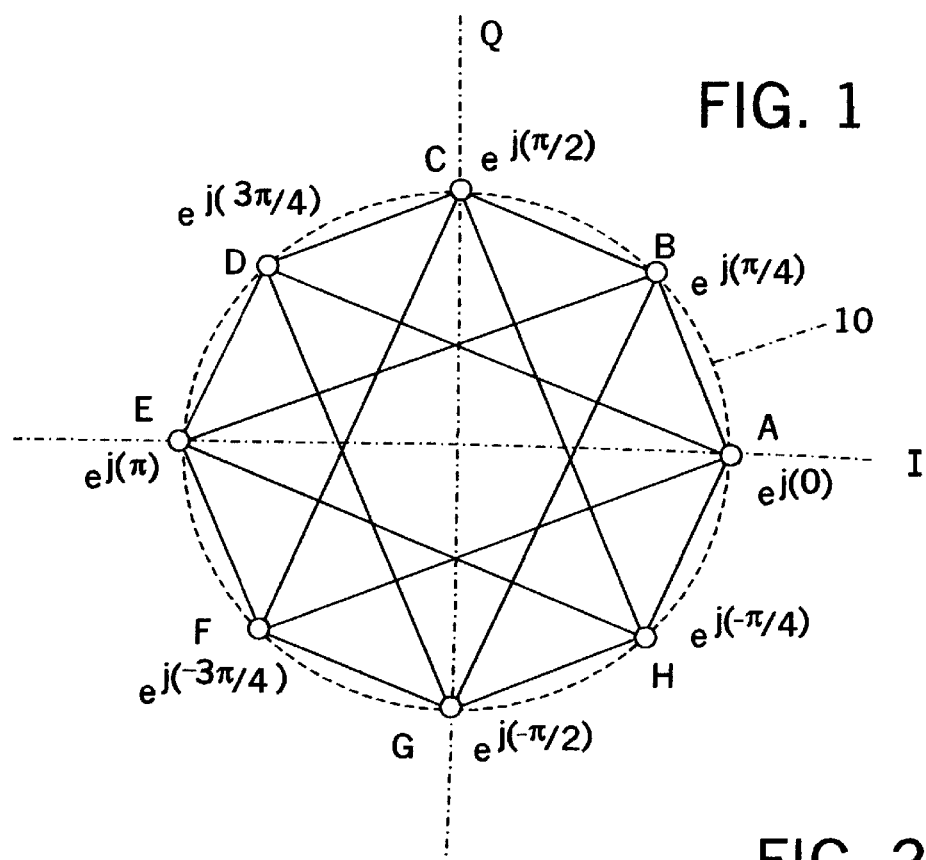
FIG. 1 is a differential constellation diagram of the symbols utilized in a π/4-DQPSK communication system.

FIG. 1 illustrates the differential constellation diagram utilized in a conventional π/4-DQPSK modulator. As previously described, π/4-DQPSK modulation is a 2-level modulation technique transmitting two bits per symbol. A π/4-DQPSK modulator receives a stream of bits, two bits at a time, i.e., one symbol at a time, and responds to each bit pair by generating a two-component output signal specifying one of eight points A–H equally spaced about a circle, shown dotted at 10, in the complex plane defined by real (I) and imaginary (Q) axes. The phase of each point A–H represents a different phase with respect to a carrier on which the output signal is modulated. Each of the four possible 2-bit combinations results in a different one of four ($2^2$) possible shifts from the previous phase, namely, ±π/4 and ±π/4. Accordingly, the output of a π/4-DQPSK modulator depends not only on its current 2-bit input, but also on the state of its previous output.

As FIG. 1 shows, if the symbol generated at a given time represents an even multiple of π/4 (states A, C, E or G), the subsequent symbol can represent only an odd multiple of π/4 (states B, D, F or H). The same is true of all odd multiples of π/4. If the phase that results from one symbol in the bit stream is an odd multiple of π/4 (states B, D, F or H), the phase resulting from the subsequent symbol will be an even multiple of π/4 (states A, C, E or G).

As an example, assume that the current symbol is at state A, representing a phase angle of 0 radians. The subsequent symbol can represent only an odd multiple of π/4. That is, from state A, phase transitions can only occur to states B (π/4), D (3π/4), F (-3π/4) or H (-π/4). Assume that the phase transitioned to state B. Then, the next symbol subsequent to state B, can represent only an even multiple of π/4. Thus, from state B, phase transitions can only occur to states C (π/2), E (π), G (-π/2) or A (0). The phase transitions occur throughout the bit stream.

Figure 2:
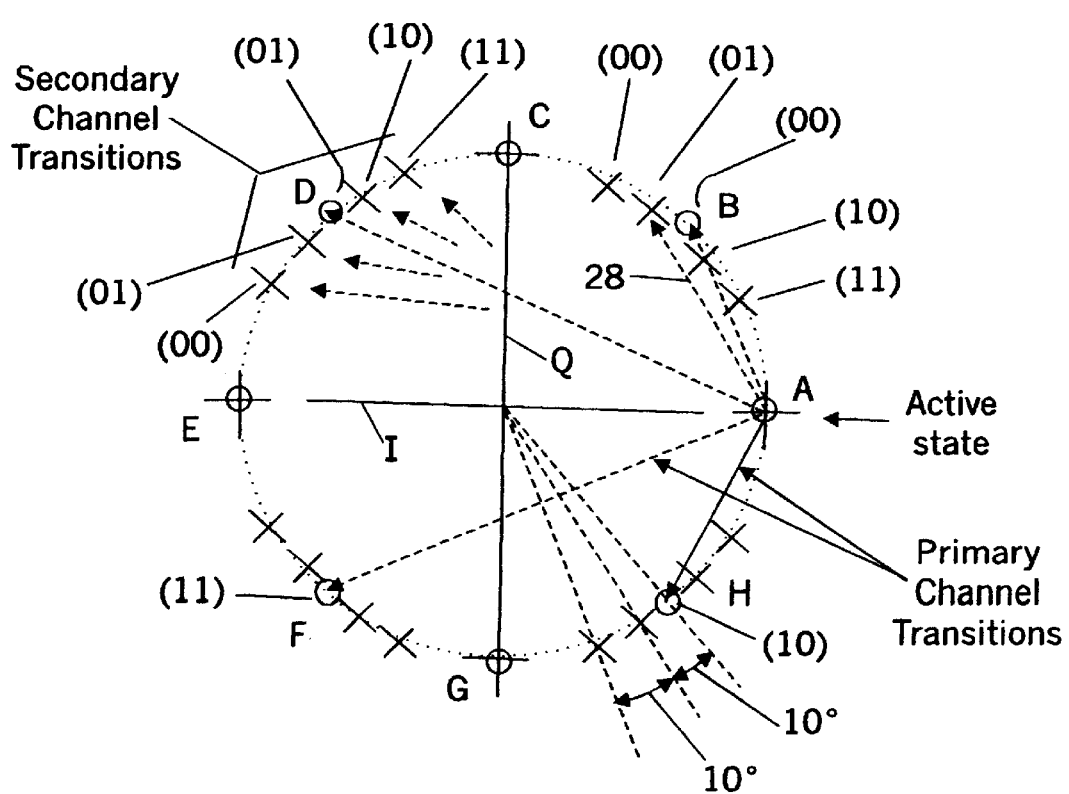
FIG. 2 is a differential constellation diagram of the symbols included in the primary and secondary channel transitions in an enhanced π/4-DQPSK communication system according to the present invention.

FIG. 2 shows a differential constellation of the enhanced π/4-DQPSK modulation technique according to the present invention, illustrating the primary and secondary phase (or channel) transitions. The primary phase transitions occur between states A–H and are the phase transitions which occur in conventional π/4-DQPSK modulation as previously described with respect to FIG. 1.

The secondary phase transitions are illustrated as "X's" around the primary phase transitions A–H. For convenience, secondary channel transitions are only illustrated at states B, D, F and H in FIG. 2. The primary phase transitions contain the bulk of the phase information, while the secondary phase transitions contain smaller amounts of phase information used to adjust or modify the primary phase transition. An understanding of the different constellation shown in FIG. 2 will become apparent as the transmitter and receiver according to the present invention are described below.

Figure 3:
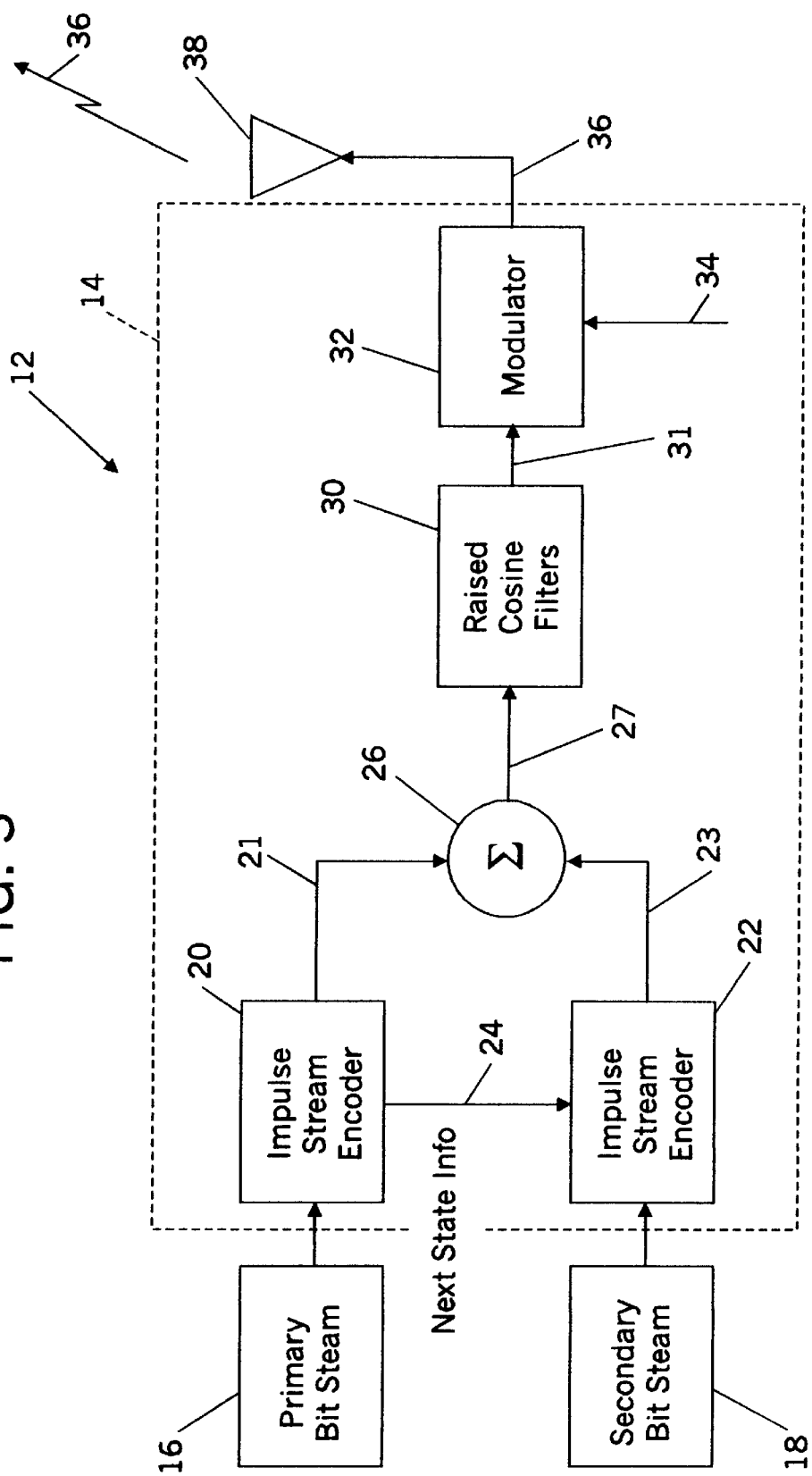
FIG. 3 is a block diagram of a transmitter utilized in the enhanced π/4-DQPSK communication system according to the present invention.

FIG. 3 is a block diagram of a transmitter, shown generally at 12, according to the present invention. The transmitter 12 includes an enhanced π/4-DQPSK modulator 14. In such an arrangement, a signal (voice, data, etc.) is applied to the transmitter 12 front-end circuitry (not shown), which digitizes the signal, performs various levels of encoding and framing of the resultant raw digitized signal, and produces a resultant output as a stream of bits. These are illustrated in FIG. 3 as primary 16 and secondary 18 bit streams, respectively. The primary bit stream 16 is input to an impulse stream encoder 20 which generates a complex signal as a series of impulses on a line 21 representative of the primary bit stream 16. The secondary bit stream 18 is also input to an impulse stream encoder 22, which generates a complex signal as a series of impulses on a line 23 representative of the secondary bit stream 18. However, the series of impulses on the line 23 produced by the impulse stream encoder 22 is dependent on the series of impulses on the line 21 produced by the impulse stream encoder 20, via the next state info signal 24 produced by the impulse stream encoder 20 and received by the impulse stream encoder 22. The next state info signal 24 contains information regarding the primary phase transition.

The impulse stream encoder 20 determines the phase transition from the present primary state to the next primary state. For instance, referring to FIG. 2, if the primary phase transition occurred between states A (present state) and state D (next state), the impulse stream encoder 20 would add 3π/4 to the present state A to transition to the next state D. The next state info signal 24 essentially informs the impulse stream encoder 22 of the amount of angular movement in the primary phase transition, along with the state transition information, e.g., state transition from state A to state D. This information is utilized by the impulse stream encoder22 to determine the secondary phase transition to arrive at one of the sub-states (X's) around the primary phase transition. The impulse stream encoder 22 will shift the primary phase transition (+3π/4) a predetermined amount of radians to arrive at the secondary phase transition. Both the primary and secondary transitions can be viewed as moving from a reference point to a next point in the differential plane of FIG. 2 defined by the real (I) and imaginary (Q) axes. An example of illustrating operation is provided below.

Referring to FIGS. 2 and 3, assume the primary bit stream 16 represents the digitized bits "001101 . . . " and the secondary bit stream 18 represents the digitized bits "011011 . . . ". Since π/4-DQPSK modulation is a 2-level modulation technique, two bits are represented in each DQPSK symbol. The impulse stream encoder 20 receives the first two bits of the primary bit stream 16, namely, "00". Assume further that the present state is state A, indicated as the active state in FIG. 2. Receiving bits "00" at the impulse stream encoder 20 represents a primary phase transition of 45° to state B. (For clarity purposes, phase transitions will hereafter be referred to in terms of degrees rather than radians.) The resulting impulse stream 21 output by the impulse stream encoder 20 will reflect this phase transition.

Transitioning from state A to state B can be viewed as simply adding 45° to state A to transition to state B. This addition of 45°, along with state transition information in the form of the present to next state transition, is represented on the next state info signal 24 input to the impulse stream encoder 22. The impulse stream encoder 22 receives the first two bits of the secondary bit stream 16, namely, "01". By knowing the phase (+45°) and state (A to B) transitions of the primary channel, via next state info signal 24, and knowing a priori the bit representations of the secondary phase transitions, the impulse stream encoder 22 is able to generate the impulse stream 23 representing a modification of the primary phase transition, i.e., the secondary phase transition.

The impulse stream encoder 22 is programmed with the secondary phase transition spread and also with the bits represented by each secondary state within the spread. For example, assume that the secondary spread is 10°, then the secondary states would occur around the primary states A–H at ±10° intervals, with the number of secondary states limited by the number of bits per symbol increase associated with the secondary channel.

As shown in FIG. 2, increasing the data rate by two bits per symbol, results in four secondary states surrounding each primary state A–H. If a 10° secondary spread is assumed, one bit allocation scheme might be as follows: +20° represents 00; +10° represents 01; −10° represents 1; and −20° represents 11. Of course, other bit allocation schemes and/or phase spreads may be utilized without departing from the spirit and scope of the present invention. Further, while the secondary channel is being described herein as adding two bits per symbol, three, four, five, etc. bits per symbol can be added by the secondary channel on top of the existing two bits per symbol of the primary channel. For instance, if the secondary channel added three bits per symbol, eight ($2^3$) secondary states would surround each primary state A–H in FIG. 2. The number of bits per symbol added by the secondary channel and the secondary phase spread are limited by zero level transitions.

The impulse stream encoder 22 knows, via next state info signal 24, that the primary phase transition is +45° (state A to state B). The impulse stream encoder 22 also knows that the first two bits of the secondary bit stream "01" represent a secondary phase transition of +10°. In order to represent "01" in the secondary phase transition, the impulse stream encoder 22 has to add 10° to the primary phase transition of 45° (state B). Thus, the impulse stream on the line 23 output by the impulse stream encoder 22 represents such addition/subtraction. The impulse streams on lines 21, 23 are summed at a summation block 26 producing a complex signal on a line 27 representative of the modified DQPSK phase transition illustrated by arrow 28 in FIG. 2. The operation of the impulse stream encoders 20,22 is primarily done via lookup tables.

The complex output of the summation block 26 on the line 27 is input to one or more conventional raised cosine filters 30, generally having a very consistent impulse response. The complex filtered signal on line 31 is fed to a conventional IQ, or Quadrature, modulator 32 which modulates a carrier 34 primarily with the generated phase information representative of the primary 16 and secondary 18 bit streams. The phase modulated signal 36 is transmitted over the air by the transmitter 12 via antenna 38.

In this manner, the effective transmission rate of the transmitter 12 can be doubled. For instance, if the transmitter 12 is transmitting data packets 0–10, conventionally the transmitter would send the first data packet in slot 0, wait for an acknowledgement from the receiver, send the next data packet in slot 1, wait for an acknowledgement from the receiver, send the next data packet in slot 2, wait for an acknowledgement from the receiver, etc. By utilizing the above-described secondary channel transitions, the transmitter 12 can simultaneously send the primary channel transition in slot 0 and the secondary channel transition, representing the next data packet, in slot 1. If an acknowledgement is received from the receiver indicating that both slots were received, the transmitter 12 knows that the receiver is receiving the secondary channel and the data rate of the transmitter 12 has been effectively doubled. This would require the implementation of some type of ACK/NACK (Acknowledge/Not Acknowledge) protocol to let the transmitter know whether the secondary channel transitions are being demodulated. RSSI (Received Signal Strength Information) levels, or some other means, could be used as well.

Figure 4:
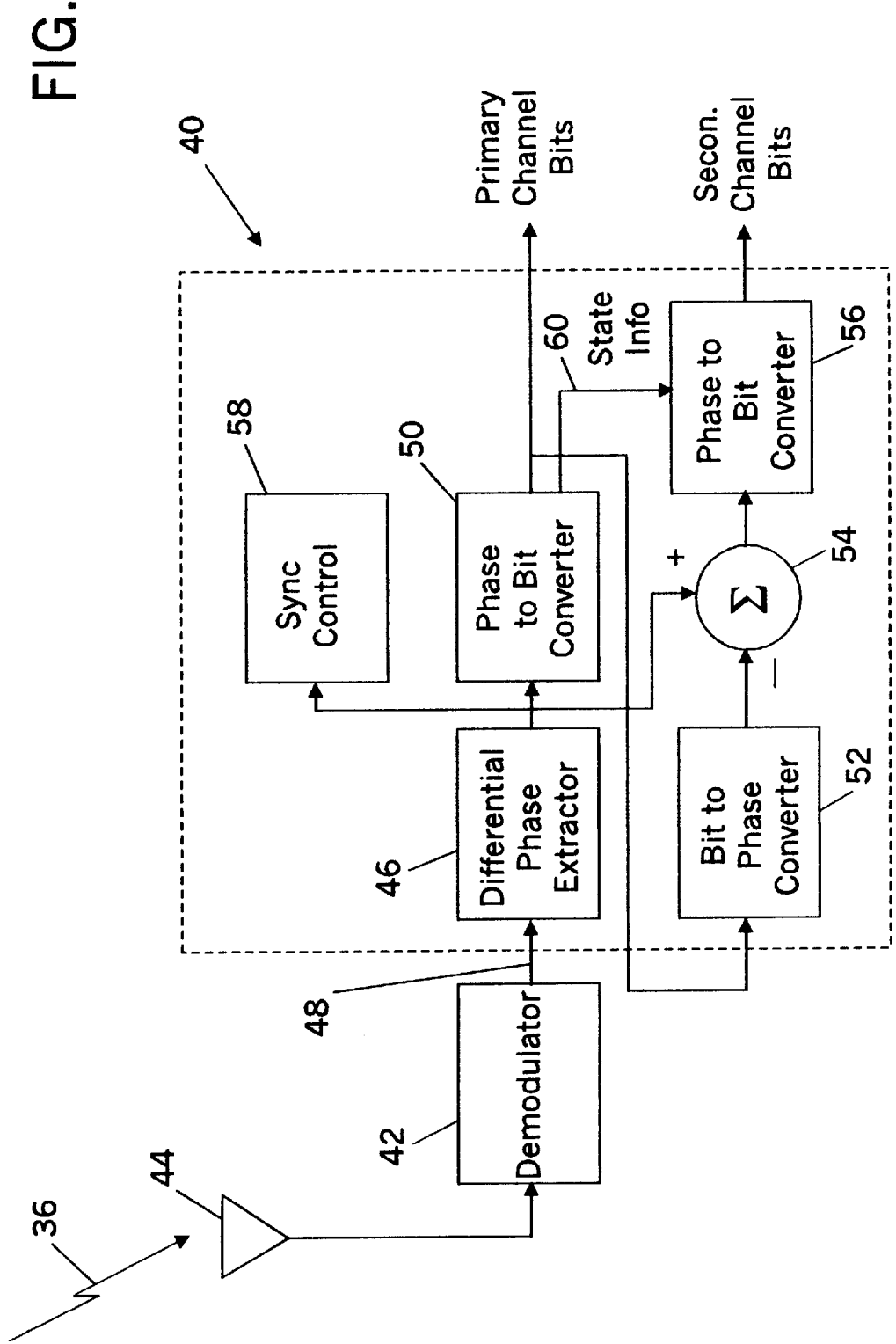
FIG. 4 is a block diagram of a receiver utilized in the enhanced π/4-DQPSK communication system of the present invention.

FIG. 4 illustrates a receiver, shown generally at 40, according to the present invention. The receiver 40 includes a demodulator 42 receiving the transmitted signal 36 via an antenna 44. A phase differentiator, or differential phase extractor, 46 measures the differential phase in the received/demodulated signal on line 48. The differential phase output by the differential phase extractor 46 is received by a phase to bit converter 50 which converts the measured differential phase into a string of primary channel bits. The string of bits output by the phase to bit converter 50 is input to a bit to phase converter 52, which converts the primary channel bits into a relative phase. A summation block 54 subtracts the relative phase from the measured differential phase. The output of the summation block 54 is fed to a phase to bit converter 56 which converts the resulting phase values to a string of secondary channel bits. Detailed operation of the receiver 40 is provided below.

The demodulator 42 receives the transmitted signal 36 and essentially extracts only the phase information present on the modulated carrier of the transmitted signal. The phase information is output by the demodulator 42 as a series of symbols on the line 48. The series of symbols on the line 48 are input to the differential phase extractor 46 which extracts the differential phase over a period of one symbol. Essentially, the differential phase extractor 46 extracts the phase at the beginning and at the end of a symbol, and determines the difference.

The output of the differential phase extractor 46 is fed to a sync control 58 which determines if there is a sequence of phase transitions that represent a sync word. The sync control 58 enables the acquisition of initial phase, initial frequency offset, and symbol/frame timing, which are necessary for demodulation. After syncing is complete, the receiver 40 essentially knows the precise point at which the transmitted data begins, and can begin demodulating.

The output of the differential phase extractor 46 is also input to the phase to bit converter 50 which takes the phase difference determined by the differential phase extractor 46 and maps it to two bits. The phase to bit converter 50 maps the phase differences to the primary channel bits. As an example, referring to FIG. 2 and assuming that the secondary channel transitions are not present, assume that the present state is state A and the differential phase extractor determined a phase difference of 45°. A phase transition of 45° indicates a transition to state B. The phase to bit converter 50 maps the phase transition of 45° to state B and outputs "00" as the primary channel bits. Similarly, a phase transition of 135° indicates a transition to state D. The phase to bit converter 50 maps the phase difference of 135° and outputs "01" as the corresponding primary channel bits.

However, since the primary phase transitions have been adjusted to accommodate secondary channel bits, the differential phase extractor 46 will determine phase differences not equal to the phase differences associated with the primary channel transitions A–H. Accordingly, the phase to bit converter 50 must be able to accommodate the adjustments made to the primary phase transition by the secondary channel. Depending on the spread of the secondary channel, ranges can be set around the primary transitions A–H wherein if a differential phase is determined that falls within a particular range, it will be mapped by the phase to bit converter 50 to the primary transition associated with that particular range.

For example, a primary phase transition from state A to state B may be defined as occurring within the range of 10°–80°, 5°–85°, 0°–90°, etc. Thus, if the phase to bit converter 50 receives any phase difference within that range, it outputs "00" as the primary channel bits. Similar ranges may be utilized for the other primary phase transitions.

The output of the phase to bit converter 50 is routed to the bit to phase converter 52 which determines the appropriate phase transition from the primary bits. For example, if the primary bits output by the phase to bit converter 50 are "00", the bit to phase converter 52 would map the primary bits to the corresponding primary channel transition of 45°. Essentially, the bit to phase converter 52 maps the primary bits to the associated primary channel transition, regardless of the phase difference actually determined by the differential phase extractor 46.

In our previous example, the primary channel transition was 45° (state A to state B), and the secondary channel transition was +10°, resulting in a modified phase transition of 55° as shown by arrow 28 in FIG. 2. Thus, the output of the differential phase extractor 46 would be 55°; the modified phase transition transmitted on signal 36 across the radio channel. This value should fall within an appropriate range set at the phase to bit converter 50, and is mapped by the phase to bit converter 50 to primary bits "00" which are output as the primary channel bits. The primary bits "00" are fed to the bit to phase converter 52, which maps them to the primary channel transition of 45°, which is output by the bit to phase converter 52.

The outputs of the differential phase extractor 46 and the bit to phase converter 52 are fed to the summation block 54, which subtracts the phase value output by the bit to phase converter 52 from the differential phase value determined by the differential phase extractor 46. In the above example, the summation block 54 performs the operation 55°−45°=10°.

The output of the summation block 54, 10° in the previous example, is fed to the phase to bit converter 56. The phase to bit converter 56 maps the phase output by the summation block 54 to the secondary channel bits. The phase to bit converter 56 knows a priori the secondary channel spread and the secondary bits associated therewith. The phase to bit converter 56 also receives a state info signal 60 from the phase to bit converter 50. The state info signal 60 basically tells the phase to bit converter 56 the primary phase transition. By knowing the primary phase transition, the phase to bit converter 56 is able to map the phase values output by the summation block 54 to the secondary bit stream.

For instance, referring to FIGS. 2 and 4 in the above example, the state info signal 60 informs the phase to bit converter 56 that the primary phase transition was 45°, namely, from state A to state B. The phase to bit converter 56, upon receiving a +10° signal from the summation block 54, maps +10° to the secondary bits "01" which are output as the secondary channel bits. Similarly, if the phase to bit converter 56 would have received a +20° value, it would have mapped phase value to secondary bits "00". It follows that a −10° value would be mapped to secondary bits "10", and a −20° value would mapped to secondary bits "11". The primary and secondary channel bits are then fed to a data modem, a vocoder, a control device, or any other device at the receiving end.

It should be noted that the phase values described above will not be exact due to internal component tolerances and external noise and other factors affecting the transmitted signal. However, such fluctuations are common and can be taken into account in system/component design.

If the secondary spread is made small, precise phase value measurements are necessary in order to determine the secondary channel transitions. If this is the case, some form of adaptive equalization may be required at the receiver end in order to remove the effects ISI (Intersymbol Interference) on the transmitted signal. ISI is generally caused by the IF filters at the receiving end, and may need to be removed if accurate phase measurement is required.

In addition, fading may cause fluctuations in the transmitted signal. If the fluctuation is fast it usually means that a magnitude notch, i.e., a dip in the signal, is present. Otherwise, the phase is probably moving slow relative to the transmitted symbol rate. If the magnitude of the transmitted signal is drastically changing, then both the primary and secondary channels will suffer. In that case the overall bit rate of both the primary and secondary channels would have the same basic BER (Bit Error Rate).

Single root raised cosine filters may be used in place of the raised cosine filter at the transmitter. However, both the transmitter and the receiver would require a single root raised cosine filter. Adaptive equalizers may also need to be added for the detection of smaller phase values. At the receiver, the root raised cosine filter would need to placed at the base band signal.

Transparent detection of the secondary channel presumes that some FEC (Forward Error Correction) or other coding is used to verify the success or failure of detection. Non-transparent detection of the secondary bits would not require this sensing and would be done by simply transmitting raw bits indicating transmission of the secondary channel.

While the invention has been described with particular reference to the drawings, it should be understood that various modifications could be made without departing from the spirit and scope of the present invention.

What is claimed is:

1. A transmitter for transmitting a modulated signal across a wireless network comprising:
    a first encoder for receiving a first data signal to be transmitted and developing a first string of phase transitions at a first select bit rate per phase transition;
    a second encoder for receiving the first string of phase transitions and a second data signal to be transmitted and developing a second string of phase transitions at a second select bit rate per phase transition;
    a combiner associated with the first and second encoders for combining the first and second string of phase transitions to develop a modified first string of phase transitions; and
    a modulator receiving the modified first string of phase transitions from the combiner and sequentially developing the modulated signal to be transmitted across a radio channel, said modulated signal including a string of modified phase transitions with each modified phase transition containing information relative to both the first and second string of phase transitions to increase the effective data rate to be a combination of the first select data rate and the second select data rate.

2. The transmitter of claim 1, wherein the first encoder comprises a first impulse stream encoder receiving the first data signal and generating a first impulse stream representative thereof, and wherein the second encoder comprises a second impulse stream encoder receiving the second data signal and generating a second impulse stream representative thereof.

3. The transmitter of claim 2, wherein the second impulse stream encoder receives an information signal from the first impulse stream encoder indicative of the first string of phase transitions in the first data signal, and wherein the second impulse stream generated by the second impulse stream encoder represents a modification of the first phase transition in the first data signal.

4. The transmitter of claim 2, wherein the combiner comprises a summer summing the first and second impulse streams.

5. The transmitter of claim 1, wherein the modulator comprises an IQ modulator.

6. The transmitter of claim 1, wherein the modulated signal comprises a DQPSK signal.

7. A system for providing communication across a wireless network comprising:
    a transmitter for transmitting a modulated signal across a wireless network at a higher effective data rate comprising a first encoder for receiving a first data signal to be transmitted and developing a first string of phase transitions at a first select bit rate per phase transition, a second encoder for receiving a second data signal to be transmitted and the first string of phase transitions and developing a second string of phase transitions at a second select bit rate per phase transition, a combiner associated with the first and second encoders for combining the first and second string of phase transitions to develop a modified first string of phase transitions, and a modulator receiving the modified first string of phase transitions from the combiner and sequentially developing the modulated signal to be transmitted across a radio channel, said modulated signal including a string of modified phase transitions with each modified phase transition containing information relative to both the first and second data signals to increase the effective data rate to be a combination of the first select data rate and the second select data rate; and
    a receiver for receiving the modulated signal, the receiver comprising:
        a phase differentiator determining differences between successive phase transitions in the modulated signal, the differences comprising the transmitted phase transitions;
        a first converter converting the transmitted phase transitions into an approximation of the first data signal;
        a second converter converting the approximated first data signal into a first string of phase transitions; and
        a subtractor subtracting the first string of phase transitions from the transmitted phase transitions to generate the second string of phase transitions.

8. A method of transmitting a modulated signal across a wireless network comprising the steps of:

receiving a first data signal to be transmitted and developing a first string of phase transitions at a first select bit rate per phase transition;

receiving a second data signal to be transmitted and the first string of phase transitions and developing a second string of phase transitions at a second select bit rate per phase transition;

combining the first and second string of phase transitions to develop a modified first string of phase transitions;

modulating the combined first and second string of phase transitions to sequentially develop the modulated signal including a string of modified phase transition with each modified phase transition containing information relative to both the first and second data signals to increase the effective data rate to be a combination of the first select data rate and the second select data rate; and transmitting the modulated signal across the wireless network.

9. The method of claim 8, further comprising the steps of:

generating a first impulse stream representative of the first data signal; and generating a second impulse stream representative of the second data signal, wherein the step of combining the first and second string of phase transitions comprises the step of combining the first and second impulse streams.

10. The method of claim 9, wherein the step of combining the first and second impulse streams comprises the step of summing the first and second impulse streams together.

11. The method of claim 8, wherein the modulated signal comprises a DQPSK signal.

12. A method of communicating across a wireless network comprising the steps of:

transmitting a modulated signal across a radio channel comprising receiving a first data signal to be transmitted and developing a first string of phase transitions at a first select bit rate per phase transition, receiving a second data signal to be transmitted and the first string of phase transitions and developing a second string of phase transitions at a second select bit rate per phase transition, combining the first and second string of phase transitions to develop a modified first string of phase transitions, modulating the modified first string of phase transitions to sequentially develop the modulated signal including a string of modified first phase transitions with each modified first string of phase transitions containing information relative to both the first and second data signals to increase the effective data rate to be a combination of the first select data rate and the second select data rate, and transmitting the modulated signal across the radio channel;

receiving the modulated signal; and separating the received modulated signal into first and second phase transitions representative of the first and second data signals.

13. The method of claim 12, wherein the step of separating the received modulated signal into a first and second string of phase transitions representative of the first and second data signals comprises:

determining differences between successive phase transitions in the received modulated signal, the differences comprising transmitted phase transitions, converting the transmitted phase transitions into an approximation of the first data signal, converting the approximated first data signal into a first string of phase transitions, and subtracting the first phase transitions from the transmitted phase transitions to generate second phase transitions.

14. A receiver for receiving a modulated signal, the modulated signal comprising a string of phase transitions with each phase transition containing information relative to first and second data signals, and separating the modulated signal into a first and second string of phase transitions representative of the first and second data signals, the receiver comprising:

a phase differentiator determining differences between successive phase transitions in the modulated signal, the differences comprising the transmitted phase transitions;

a first converter converting the transmitted phase transitions into an approximation of the first data signal;

a second converter converting the approximated first data signal into the first string of phase transitions; and a subtractor subtracting the first string of phase transitions from the transmitted phase transitions to generate the second string of phase transitions.

15. The receiver of claim 14, further comprising a third converter converting the second string of phase transitions into an approximation of the second data signal.

16. The receiver of claim 14, wherein the modulated signal comprises a DQPSK signal.

17. A method of receiving a modulated signal, the modulated signal comprising a string of phase transitions with each phase transition containing information relative to first and second data signals, and separating the modulated signal into a first and second string of phase transitions representative of the first and second data signals, the method comprising:

receiving the modulated signal;

determining differences between successive transitions in the modulated signal, the differences comprising transmitted phase transitions;

converting the transmitted phase transitions into an approximation of the first data signal;

converting the approximated first data signal into a first string of phase transitions; and subtracting the first string of phase transitions from the transmitted phase transitions to generate a second string of phase transitions.

18. The method of claim 17, further comprising converting the second string of phase transitions into an approximation of the second data signal.

19. The method of claim 17, wherein the modulated signal comprises a DQPSK signal.

* * * * *